Patented Aug. 4, 1925.

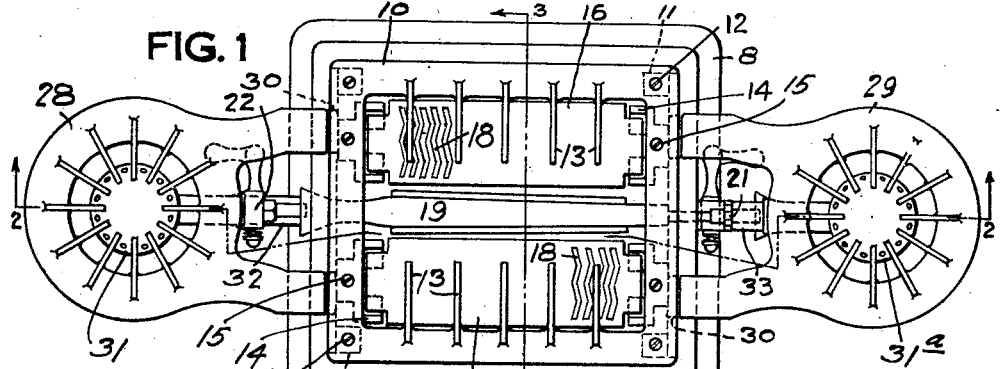

1,548,185

UNITED STATES PATENT OFFICE.

WILLIAM CARR, OF NEWARK, OHIO.

PORTABLE STOVE.

Application filed June 21, 1924. Serial No. 721,500.

*To all whom it may concern:*

Be it known that I, WILLIAM CARR, a citizen of the United States, and resident of Newark, in the county of Licking and State of Ohio, have invented a new and useful Improvement in Portable Stoves; and I do hereby declare the following to be a full, clear, and exact description thereof.

My invention relates to stoves employing gas or liquid as a fuel, and particularly to a type of stove which, while it is readily portable and occupies but a small space, is capable of accommodating a number of cooking vessels simultaneously.

My invention has for its object to simplify and improve generally devices of the character referred to, and is directed more particularly to improved means for directing and concentrating the heat of a movable burner at desired points, and to improve the combination of supporting brackets and fuel connections for other burners and cooking vessels.

Some of the forms which my invention may take are shown in the accompanying drawings, wherein Fig. 1 is a plan view of a stove embodying my invention; Fig. 2 is a view taken on the line 2—2 of Fig. 1; Fig. 3 is a view taken on the line 3—3, Fig. 1; Fig. 4 is a view similar to that of Fig. 3, showing the burner of Fig. 3 reversed; Fig. 5 is a sectional view of a portion of one of the heat deflectors shown in Fig. 3; Fig. 6 is a modification, in plan view, of the device of Fig. 5; and Fig. 7 is a view taken on the line 7—7 of Fig. 6.

The device is provided with a base 8 which may rest upon the floor or a table, end plates 9 resting upon the base 8, and a top plate 10 which is secured to perforated flanges 11 of the end plates 9, by means of screws 12, thus rigidly tying the top plate 10 and the end plates 9 into a rigid unitary structure.

The top plate 10 is provided with grids or ribs 13 that function in the usual manner to support a cooking utensil.

Four brackets 14 are secured to the top plate 10 by means of screws 15. These brackets 14 serve as shelf-like supports for removable deflector plates 16, preferably of refractory material, two of which are provided as shown in Fig. 1, and each having end portions fitting in the brackets 14 which are disposed beneath the grids 13.

As shown more clearly in Fig. 5, the deflector plates 16 are made in two sections, the lower section 17 fitting against the underside of the upper section, in spaced relation thereto and may be securely held in such position by any desired means as bolts or wires (not shown). The upper and lower sections of the deflectors 16 are provided throughout substantially their entire length with irregularly shaped openings 18 so that the heat from a burner to be hereinafter described is distributed evenly and is not readily dissipated, it being understood that jets of flame are directed against the sides of the deflectors. By tilting the inner edges of the deflectors 16, (Fig. 1) it will be seen that they may be slid out from beneath the grids 13 and removed for cleaning or replacement.

A burner 19 is rotatably supported in the walls 9 and is provided with oppositely disposed angularly directed openings 20 (Fig. 3). A knob 21 is provided for rotating the burner to either the position indicated in Fig. 3 or that indicated in Fig. 4, gas being supplied to the left hand end of the burner through a valve 22. When it is desired to concentrate the heat from the burner 19 against the underside of vessels resting upon the grids 13, the burner is turned to the opposite side indicated in Fig. 3 so that the flames issuing through the openings 20 may be directed upwardly. The inner sides of the walls 9 are provided with ribs 23 for supporting a drip-pan 24, as shown in Fig. 2, while a grid 25 is supported by the drip pan 24. Whenever it is desired to broil food placed upon the grid 25, the burner 19 is turned to the opposite side as indicated in Fig. 4, so that the burner openings 20 will be directed toward the underside of the deflectors 16, the deflectors 16 being provided with toothed portions 27 to retain and spread the heat of the flames from the burner 20.

It will thus be seen that the flames from the burner 19 may be directed to the point where the greatest amount of heat is desired at any given time.

I also provide outside supporting brackets 28 and 29 that have angularly disposed lugs 30 (Fig. 2) at their inner ends engaging in slots cut into the top plate 10 in a manner usual in gas stoves where extra shelf room is required, but I utilize these shelf-like projections 28 and 29 for supporting cooking utensils above burners 31 and 31$^a$, respectively. The burners 31 and 31ª are supported by means of brackets 32 and 33, respectively, through the medium of flanges 34.

The brackets 32 and 33 not only serve to support the burners 31 and 31ª, but also furnish additional support for the shelves 28 and 29, as clearly shown in Fig. 2. Furthermore, the bracket 32 is hollow to serve as a conduit through which gas may be supplied to the burners 19 and 31, as indicated in dotted lines at the left hand side of Fig. 2, while the bracket 33 is hollow at its lower end as indicated in dotted lines, for conveying gas to the burner 31ª, the lower ends of the two brackets being connected by a gas pipe 37. Gas is supplied to the conduit within the bracket 32 through an opening 38 in the side thereof to which the gas line may be connected.

From the foregoing it will be seen that by the employment of a minimum number of parts of relatively small size, I provide a large cooking capacity, in addition to the control of the direction of heat by the central burner.

In Figs. 6 and 7 a grid plate 16ª of the same general type as the plate 16, is shown, with the principal difference that, instead of the nose-like projections 27 of Fig. 3, ribs 27ª are provided for retaining and distributing the heat, it being less difficult to form refractory material into ribs than it is to form it into small projections such as the projections 27, in addition to which the danger of breakage is less.

Various changes in the construction and general arrangement of parts may be made without departing from the spirit and scope of my invention as defined in the accompanying claims.

I claim as my invention:

1. A stove for consuming fluid fuel, comprising a body portion, a bracket secured at one end of said body portion and extending upwardly and outwardly, a shelf detachably connected to said body portion and supported by the outer end of said bracket, a fuel conduit connected to said bracket and having a laterally extending outlet, a burner disposed beneath said shelf and having communication with said outlet, and means for detachably connecting said burner to said bracket.

2. A stove for consuming fluid fuel, comprising a body portion, a burner disposed within said body portion, a shelf detachably secured to each of two opposite sides of said body portion, a bracket secured to each of said sides and extending upwardly and outwardly in position to support one of said shelves, a gas conduit extending to openings adjacent to each of said brackets and having an outlet at each of said openings, and a burner detachably connected to each of said brackets at points adjacent to said shelves and having communication with said outlets.

In testimony whereof I, the said WILLIAM CARR, have hereunto set my hand.

WILLIAM CARR.